Sept. 2, 1958 S. T. CARTER 2,850,091
APPARATUS FOR CUTTING EQUAL LENGTHS FROM
ARTICLE BANDING MATERIAL
Filed April 13, 1954 10 Sheets-Sheet 5

Inventor
Sidney T. Carter
by Roberts Cushman & Grover
Att'ys.

Sept. 2, 1958 S. T. CARTER 2,850,091
APPARATUS FOR CUTTING EQUAL LENGTHS FROM
ARTICLE BANDING MATERIAL
Filed April 13, 1954 10 Sheets-Sheet 8

Inventor
Sidney T. Carter
by Robert Cushman Cooper
Att'ys.

Inventor
Sidney T. Carter
by Roberts Cushman & Grover
Att'ys

United States Patent Office 2,850,091
Patented Sept. 2, 1958

2,850,091

APPARATUS FOR CUTTING EQUAL LENGTHS FROM ARTICLE BANDING MATERIAL

Sidney T. Carter, Shrewsbury, Mass., assignor to Geo. J. Meyer Manufacturing Co., Cudahy, Wis., a corporation of Wisconsin Application April 13, 1954, Serial No. 422,891

11 Claims. (Cl. 164—49)

This invention pertains to apparatus for applying shrinkable bands to containers, for instance to bottle necks, and in particular to a machine of the kind wherein the individual bands are automatically cut from a length of band-forming material which is received from a supply as a flattened tube. As here illustrated by way of example, the machine is of the general type described in the copending application of Bartlett, et al., Serial No. 256,106, filed November 13, 1951, now Patent No. 2,751,735.

It has heretofore been proposed to provide for measuring off proper lengths of material from a supply to form each successive band, for example, by the use of gripping means which moves through a predetermined path once during each cycle of operation so as to advance the length of banding material into the field of cutting means. It has also been proposed to provide the banding material itself with means, for instance spaced rows of perforations, cooperable with the feed means to insure the cutting of bands of uniform length. While such prior devices are useful in dealing with plain banding material, it has become customary to use banding material provided with decorative or advertising matter, for instance printed designs or words, either in black and white or in color, each length of banding material having a repeat of this design so that when a band is properly cut therefrom, one complete repeat of the design will be centered between the upper and lower edges of the cut band. However, in order that the design may thus be properly located on each individual band, the cutting operation must be done with great precision, and a simple cam control is not sufficient to insure the accuracy of length of the band when band material having printed designs thereon is employed. Such factors as imperfections in the printing, minute slippage or backlash in the feed system and so forth, could lead to cumulative errors in length so that eventually the knife would cut through the design. While attempts have heretofore been made to meet these latter conditions, the means employed, involving, for example, reversal of the direction of feed or alternating high and low feed velocities, cuts down production of the banding machine to the extent that such devices have not found favor with the trade.

According to the present invention, there is provided a high speed band-applying machine of the kind wherein individual bands are automatically severed from a length of banding material which is received from a supply as a flattened tube or ribbon, the machine being operative to sever bands of predetermined lengths from banding material which has spaced design areas of a color or light-reflecting character different from the intervening clear portions of the banding material and having, at the advancing end of each design area, a registering element having definite light-reflecting characteristics, the machine comprising a pair of intermittently turning feed rolls between which the ribbon is always gripped and which, when turning, always turn at substantially the same angular velocity and so as to move the ribbon in the same direction and which are operative to advance the terminal portion of a ribbon of banding material into the field of action of severing means, and wherein the turning and stopping of said feed rolls is occasioned by an electric clutch and an electric brake respectively, and wherein the supply of current to the clutch and brake is directly controlled by a single-pole, double-throw relay switch which, in normal position, is set to supply current to the clutch, and including a control device which is operative, at times, to cause the relay switch to shift from normal position to one in which it is set to supply current to the brake; the machine also comprises a single-pole, double-throw, cam-actuated switch, and a constantly rotating cam for actuating said last-named switch, said cam making one complete revolution for each cycle of operation of the machine, and a photoelectric detector including at least one photocell and means for directing a beam of light onto the moving banding material, the detector including an electrical circuit in which current varies in response to variations in the light reflecting from the surface of the banding material, said control device being capable, at times, of responding to variations in the current in the detector circuit and thereby causing the relay switch to shift from clutch-energizing to brake-energizing position, the time period within which the control device is capable of so responding to variations in current in the detector circuit being determined by the setting of the cam-actuated switch, the cam which operates the cam-actuating switch being so contoured that during any given cycle of the machine, the control device first becomes capable of responding to current variations in the detector circuit after the trailing edge of a design area has passed the beam of light and while a clear area of the banding material is being scanned by the light beam. As a further feature of the invention, the control means for the relay switch comprises a relay, an amplifier for amplifying current variations in the photoelectric detector resultant from variations in light reflected from the banding material, and a thyratron which, when triggered by current supplied by the amplifier, energizes the relay—the photoelectric detector being so designed that normally the light reflected from any portion of the banding material, other than from the registration mark, is insufficient to energize the detector to an amount sufficient to fire the thyratron, but being so designed as to respond to light reflected from the registration mark so as to fire the thyratron and cause the relay to shift the relay switch to cut off current from the clutch and apply it to the brake—the cam being so designed that, at a predetermined time after the feed roll has stopped, it so actuates the cam-operated switch as to cut off plate voltage from the thyratron, thereby permitting the relay switch to resume its normal position and restart the feed rolls. A further object is to provide drive mechanism for the band-feeding means of such character as to permit high speed operation, without sacrifice of accuracy in locating the line of severance between successive design areas of the banding material. A further object is to provide drive mechanism for the band-feeding means, including electrically actuated clutch and brake means whereby the feed movement of the banding material may be started and stopped with the greatest accuracy. A further object is to provide mechanism of the above type having provision for applying bands of different lengths and also to provide means whereby the mechanism may be adjusted for the application of plain bands if desired. Other and further objects and advantages of the invention will be pointed out in the following more detailed description and by reference to the accompanying drawings, wherein—

The apparatus herein disclosed is useful for applying bands of plain material, that is to say, material which is devoid of designs (the term "design" being herein employed to define any distinctive area, whether it be a word, picture, figure, symbol or the like and which may be printed or otherwise affixed to or incorporated in the banding material) or alternatively, to apply bands which have such design areas. When, in accordance with the present invention, material having designs thereon is employed, the banding material is provided with accurately located registration marks each corresponding to one of said design areas. This registration mark or control element is intended to cooperate with a photoelectric detector to break the circuit of an electric clutch and similtaneously to close the circuit of a brake which control, respectively, the advance and stopping of the banding material on its way toward the zone of operation of the cutting means. However, a photoelectric detector alone might not be able to distinguish between the registration mark and other portions of the design area. To avoid this difficulty, the photoelectric detector is blanked out during most of the advance motion of the banding material and is only connected into the clutch and break circuit just before the registration mark approaches the field of action of the detector.

Figure 1:
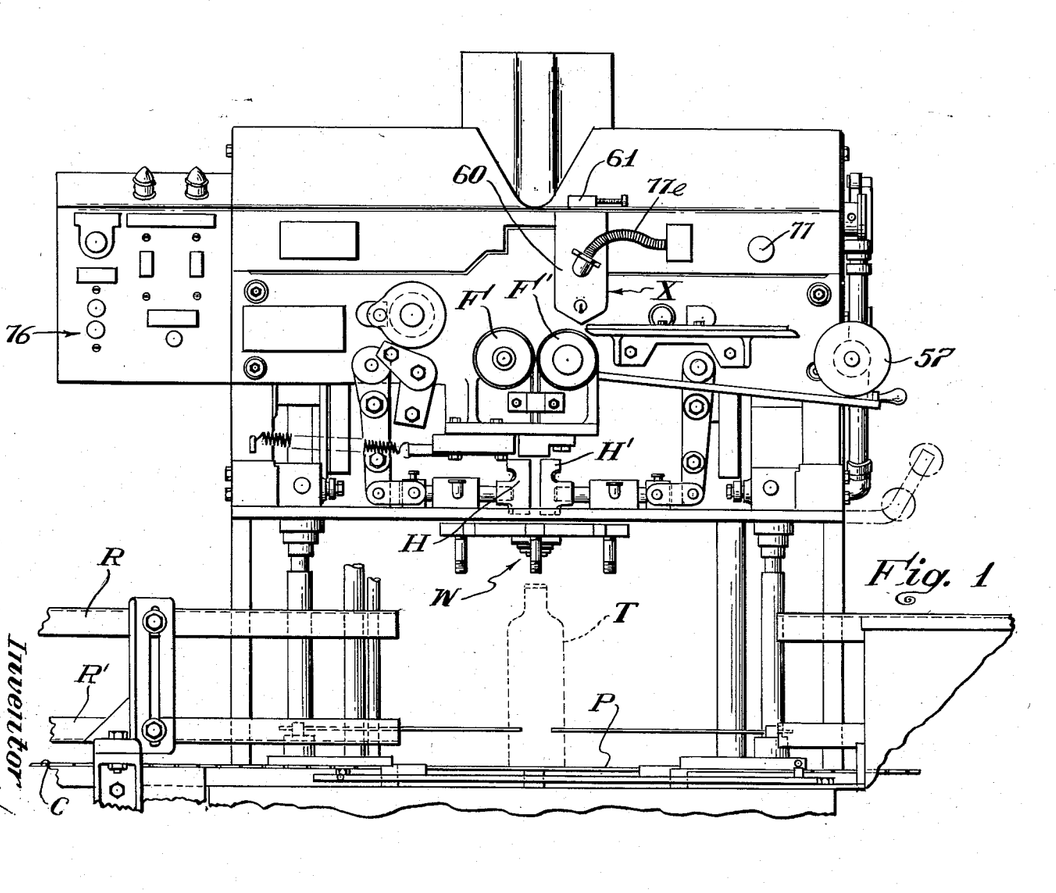
Fig. 1 is a fragmentary front elevation of a band-applying machine embodying the present invention.

Referring to Fig. 1 of the drawings, which is a fragmentary front elevation of a machine embodying the present invention (with parts broken away for simplicity in illustration), the character C indicates a horizontal conveyor of a type commonly employed for delivering articles, such for example as bottles T, to a labeling machine, such conveyor comprising an endless chain which carries a series of independent, smooth-surfaced metal plates collectively constituting the support on which the bottle rests, but which permits slippage to take place between the bottle T and the conveyor if the bottle is positively stopped. The conveyor device is shown as provided with customary guard rails R and R', and is operative to deliver the articles, for example bottles, into the field of action of a star wheel device, the upper portion of which is indicated at W, and which removes each successive bottle from the conveyor and causes it to dwell, while resting upon a fixed supporting plate P, as the band is being applied, the star wheel then restoring the bottle to the conveyor or delivering it to a second conveyor for discharge from the machine.

As above noted, the machine herein illustrated is of the general type of that disclosed in the copending application of Bartlett, et al., Serial No. 256,016, filed November 13, 1951, and which has since issued as Patent No. 2,751,735, dated June 26, 1956, and as disclosed in said copending application, comprises oppositely movable vacuum heads H and H' (Fig. 1) which are moved toward and from each other at proper intervals, these heads moving equally and oppositely from the vertical plane of the axis of the bottle while the latter is dwelling at the band-receiving position. These vacuum or suction heads H and H' are mounted upon a carriage (as disclosed in said Bartlett et al. application) which is moved back and forth from front to rear and which dwells in the forward position, with the heads H and H' properly located and spaced apart to receive between them banding material which is advanced downwardly from a supply by the oppositely moving feed rolls F and F'. When a suitable length of the banding material has been severed by cutting means 58, 59 (Fig. 10), the carriage then moves rearwardly while the severed length is held by the suction heads H and H'. As the carriage moves rearwardly, the suction heads separate. The carriage dwells in a rearward position with the suction heads disposed at opposite sides of the axis of the bottle and holding the band partially open while transfer means fully opens the band and slips it down onto the bottle neck.

Figure 2:
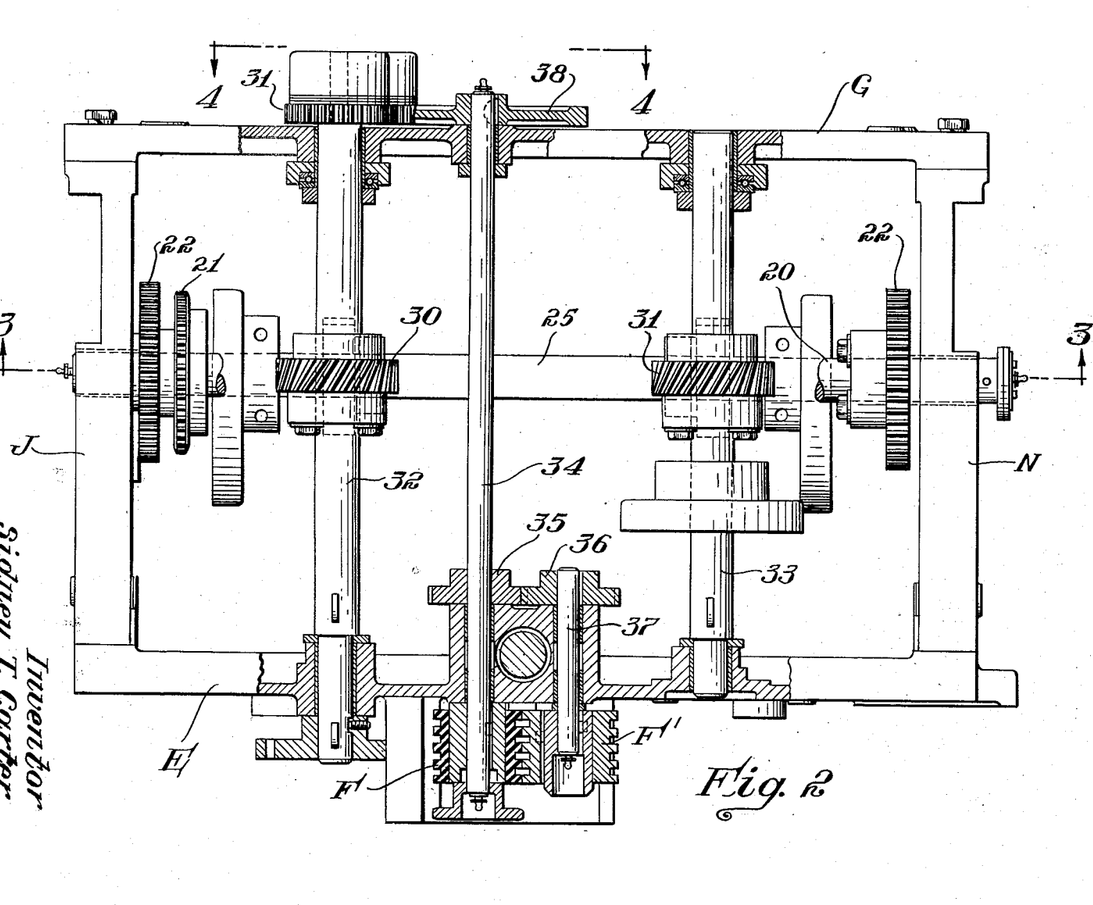
Fig. 2 is a fragmentary horizontal section, to larger scale, in the plane of the axes of the band-advancing rolls.
Figure 3:
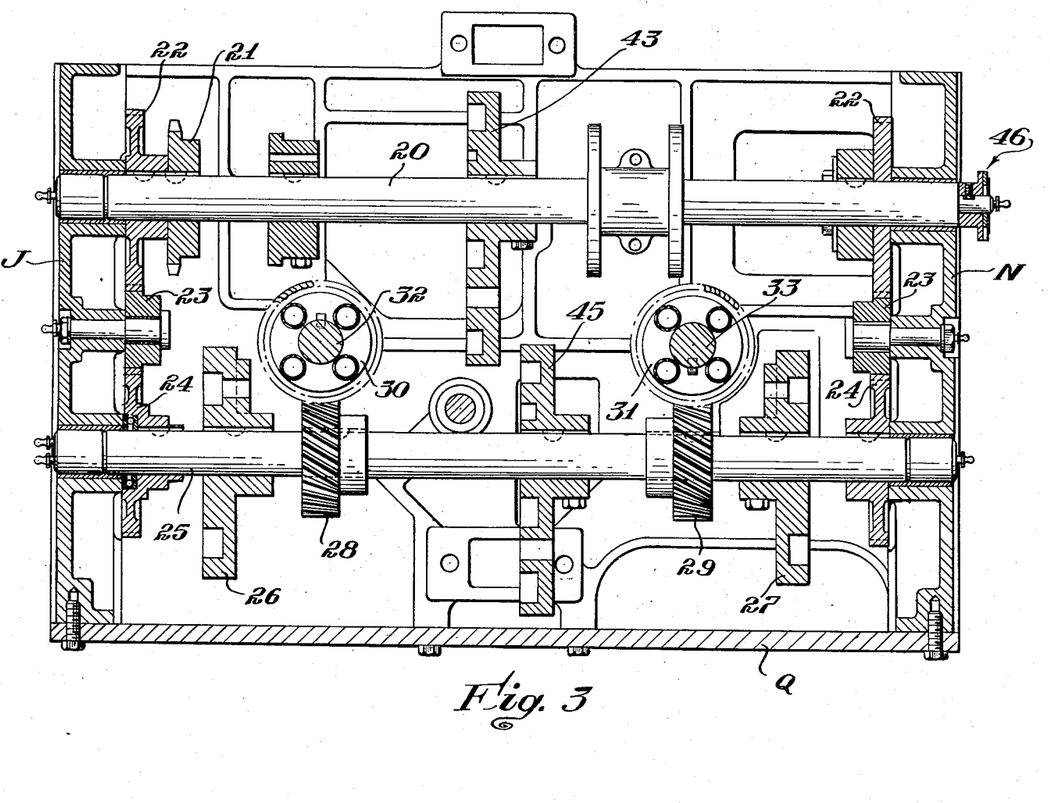
Fig. 3 is a fragmentary vertical section, omitting parts, on the line 3—3 of Fig. 2.
Figures 7, 7A:
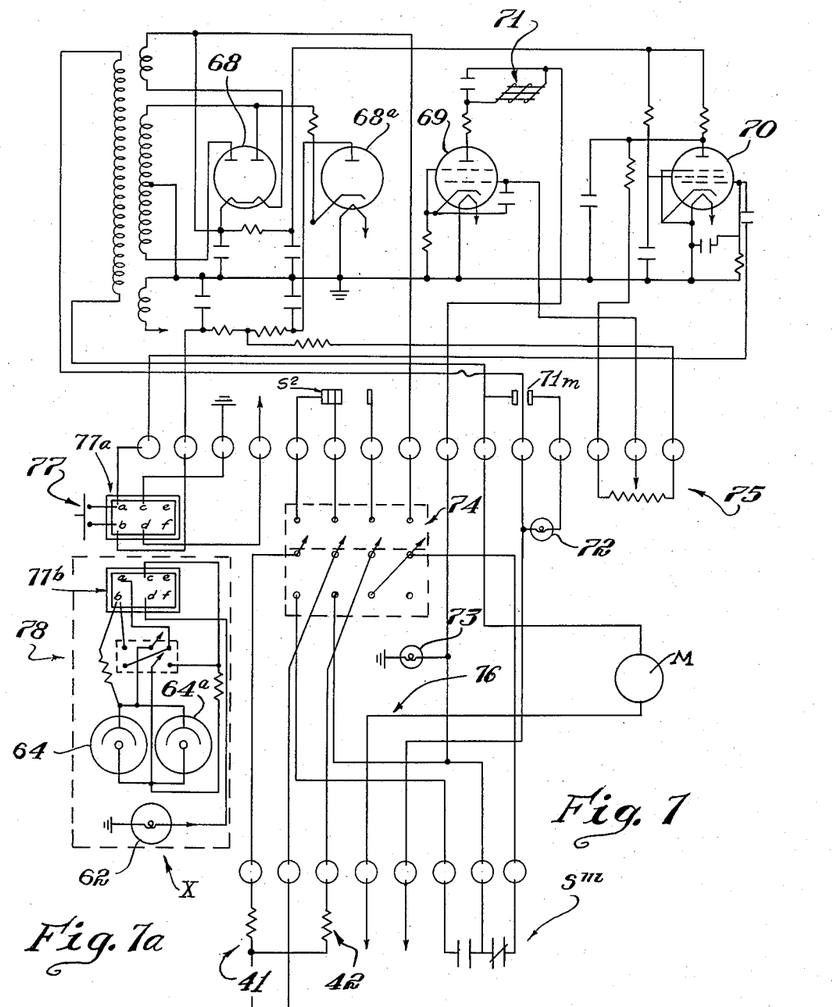
Fig. 7 is a wiring diagram illustrating one desirable arrangement for automatically controlling the feeding of the banding material toward the severing device.
Fig. 7a is a wiring diagram of the photoelectric detector unit.

Referring to Figs. 2 and 3, the numeral 20 designates a transversely extending, horizontal, main shaft, journaled in bearings carried by the side frame members J and N (Fig. 3), to which is fixed a sprocket wheel 21 which receives a drive chain, not shown, which is constantly driven by suitable motor means (controlled by manually actuated switch 76, (Fig. 7) to turn once for each cycle of operation of the machine. Fixed to the shaft 20 near one of its ends (Fig. 3) is a gear 22 which meshes with a pinion 23 (Fig. 3) mounted on a stub shaft and which, in turn, meshes with a gear 24 fixed to a second, transversely extending shaft 25 which is below the shaft 20 and which is also journaled in bearings in frame members J and N. Cams 26 and 27 are fixed to the shaft 25, and by means of appropriate connections, not shown, actuate the above referred to carriage, which supports the vacuum heads H and H' and band-severing means. Since the shaft 25 rotates once for each cycle of operation of the machine, the carriage is thus moved back and forth once during each cycle.

Skew gears 28 and 29 are also fixed to the shaft 25, and these gears mesh with corresponding gears 30 and 31 (Fig. 2) respectively, mounted on shafts 32 and 33 which extend from front to rear and which are suitably journaled in the front and rear members E and G of the machine frame.

Figure 4:
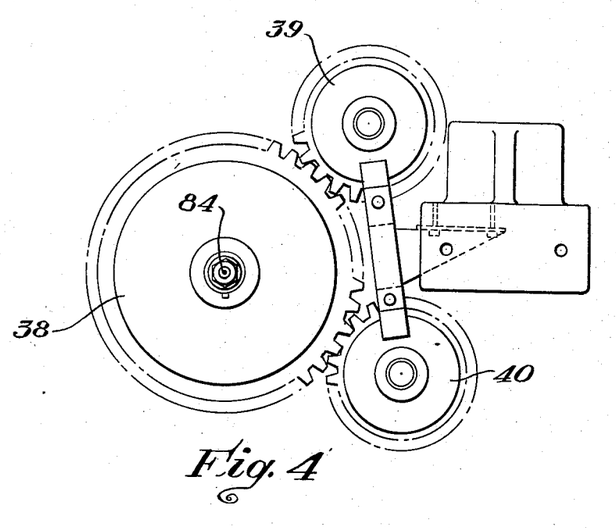
Fig. 4 is a partial rear elevation showing the drive and brake devices for controlling the feed rolls.
Figure 5:
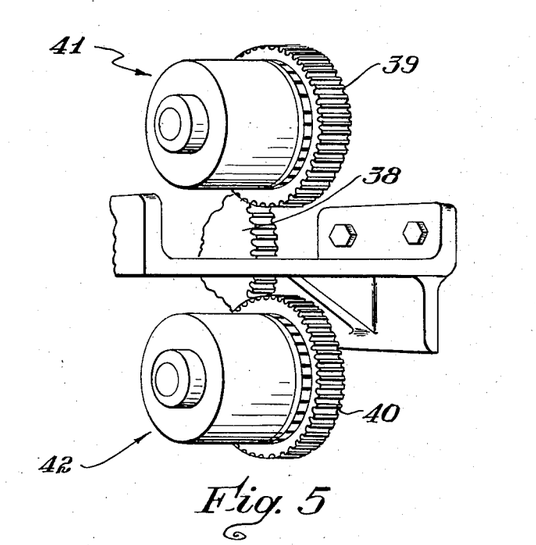
Fig. 5 is a fragmentary perspective view, looking toward the rear side of the machine, showing the electric clutch and electric brake for controlling the feed rolls.

A third shaft 34 likewise extends from front to rear and is journaled in bearings carried by the front and rear frame members, the shaft 34 projecting forwardly from the front frame member and having the feed roll F (Figs. 1 and 2) fixed to its front end. The shaft 34 carries a gear 35 which meshes with a gear 36 fixed to a shaft 37 mounted in suitable bearings carried by the front frame member E, the shaft 37 projecting forwardly from said front frame member and having a feed roll F' fixed thereto, the rolls F and F' thus turning in opposite directions. The shaft 34 extends rearwardly beyond the rear frame member G in which it is journaled and is provided at its rear end with a gear 38 which meshes with two gears 39 and 40 (Figs. 4 and 5) respectively, forming elements of an electric clutch 41 and an electric brake 42, respectively. Direct current of the order of 90 volts is useful in actuating the clutch and brake.

A cam 43 (Fig. 3) is fixed to the shaft 20, and by means of appropriate connections (not shown) actuates an expander sleeve 65 (Fig. 14) which receives the band from the suction heads H and H' and moves it into position for application to the bottle neck. A cam 45 (Fig. 3), fixed to the shaft 25, is operative, by means of suitable intervening connections, to actuate the stripper sleeve 66 (Fig. 14) which strips the band from the expander and slips it down onto the bottle neck.

Figure 6:
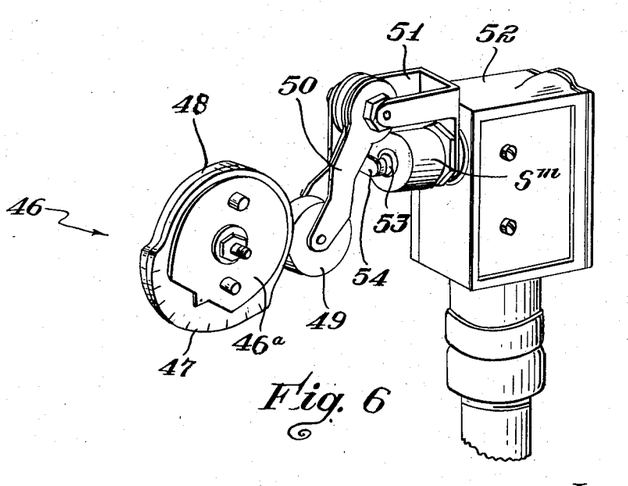
Fig. 6 is a fragmentary perspective view, looking toward the left-hand side of the machine, showing a cam-actuated, circuit controlling switch.
Figure 6A:
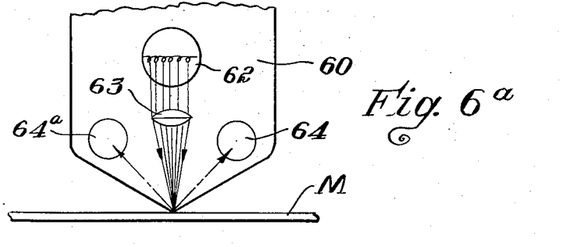
Fig. 6a is a diagrammatic elevation illustrating a photoelectric detector.

The shaft 20 extends outwardly beyond the right-hand frame member N of the machine and at its outer end (Fig. 3) carries a cam device 46 (Figs. 6 and 8) comprising a high dwell portion 47 and a low dwell portion 48. The dwell portions 47 and 48 are formed on independent disks 47ᵃ and 48ᵃ respectively (Fig. 20) which are relatively rotatable on the shaft 20. As shown in Fig. 20, the disk 48ᵃ is mounted to turn on a hub portion of disk 47ᵃ and is adjustably held in position by a clamping plate 46ᵃ. This construction permits variation in the effective length of the low dwell portion to correspond to bands of different lengths. A cam follower roll 49 (Fig. 6) is engageable, at times, with one or the other of these dwell portions of the cam device 46, this follower roll being carried by a lever 50 (Fig. 6) which is pivotally supported by a bracket 51 carried by a control box 52 (Fig. 8) which is conveniently secured to the outer surface of the right-hand frame member N of the machine. This control box carries a conventional electrical switch Sᵐ, preferably of the snap action type, having the actuating pin 53 (Fig. 6) which is moved in one direction by a spring (not shown) forming part of the switch and which is moved in the opposite direction by a lug 54 projecting from the arm 50.

The banding material, in the form of a flattened tube, is guided toward the feed rolls F and F' by a substantially horizontal table 55 (Fig. 9), the banding material being properly guided, in moving along said table, by adjustable edge guides 56. The banding material is drawn off from a suitable supply reel, not shown, and after passing through a tank (not shown) containing water or other fluid proper to soften the band, passes beneath a guide roll 57 (Figs. 1 and 9) mounted at the front of the machine and then over the table 55 to the bite of the rolls F and F'.

The switch, above referred to, which is actuated by the cam 46, normally controls the supply of current to the electric clutch 41 and to the electric brake 42.

If the banding material is plain, that is to say, unprovided with design areas, the cam 46 is sufficient, without other control devices, to insure the cutting off of proper lengths from the supply ribbon to form individual bands. Thus as illustrated for example in Fig. 18, and assuming that banding material M has, during the last previous cycle, been advanced by the feed rolls F and F', and has been cut off by the cooperative action of the fixed cutter 58 and the reciprocating cutter 59, and assuming that just prior to said cutting operation, the roll 49 has ridden up onto the high portion of the cam 46, the result of such movement of the roll 49 was to operate the switch device so that the electric clutch is now deenergized and the electric brake has been energized, thus stopping the motion of the feed rolls F and F', with the lower end of the dependent portion B of the banding material in the horizontal plane of the motion of the movable cutter 59.

Figures 10, 11, 14, 15, 18, 19:
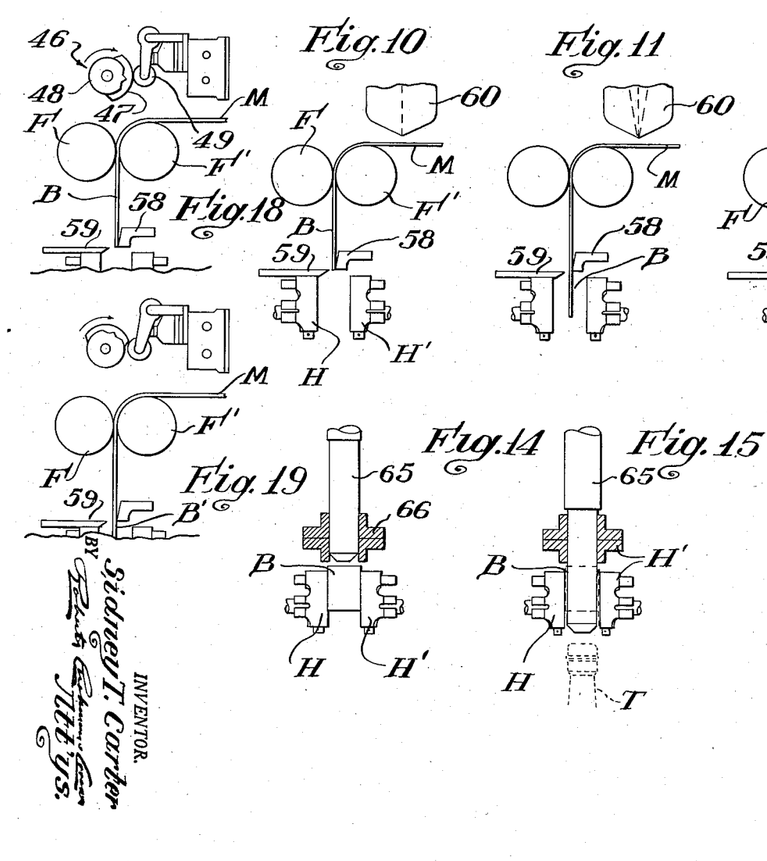
Figs. 10 to 17 are diagrams illustrative of the sequence of operation in cutting off and applying a band to a bottle neck and wherein the feed movement of the band is partially controlled by a photoelectric detector.
Figs. 18 and 19 are diagrams similar to those of Figs. 10 and 11 respectively, but showing the cam which at times modifies the action of the photoelectric detector, or which at times may constitute the sole control for the feed mechanism when using plain banding material.

Assuming that the length of banding material severed by the previous action of the cutters has been carried away by the suction heads, the continued rotation of the cam 46 will (during the next cycle) allow the follower roll 49 to engage the low portion of the cam 48, whereupon the switch device is so actuated as to supply current to the electric clutch and to break the circuit through the electric brake. The rolls F and F' immediately start to turn, and, as indicated in Fig. 19, they advance the dependent end portion B' of the banding material so that it extends down below the plane of movement of the movable cutter 59, the length of the low portion of the cam 48 being such that a proper length of the banding material extends below the plane of action of the cutter 59 at the instant when the follower roll 49 again rides up on the high portion of the cam. This again actuates the switch to throw the clutch out of action and to energize the brake—the rolls F and F' again stopping instantly, and the movable cutter 59 moving to the right, as viewed in Fig. 19, to sever the proper length of banding material. As above noted, this mechanism is all that is necessary for cutting off bands of uniform length from plain banding material.

On the other hand, if the banding material M, as diagrammatically illustrated in Fig. 8ᵇ, comprises a succession of design areas D, which may for example be printed upon the banding material (the latter assumed to be substantially transparent) then, in using such banding material, the cam device 46 may not be wholly dependable to insure the cutting off of proper lengths of material, each having one of the design areas centered as respects its opposite ends. To provide for the severance of uniform lengths from banding material such as shown in Fig. 8ᵇ, the machine is provided with a photoelectric detector device, indicated in Fig. 1 by the character X. An assembly, comprising a light source, at least one photocell, a casing having a slot-like window, and a lens for directing light from the light source to said window, or equivalent means, is herein referred to as "photoelectric detector." As here illustrated, the detector (Fig. 6ᵃ) comprises a casing 60 which is mounted at the front of the machine frame with provision, as indicated at 61 (Fig. 1) for adjusting it horizontally to a small amount so that the machine may be accommodated to banding material having design areas of different lengths. This photoelectric detector (Fig. 6ᵃ) comprises a light source 62 which emits a beam of light which is condensed by a suitable lens 63 to form a very thin line or point of light, the light passing through an opening in the bottom of the casing 60 and impinging upon the upper surface of the banding material M at about the place where the banding material leaves the left-hand edge of the table 55 (Fig. 9) in approaching the bite of the rolls F and F'. The detector device also comprises one or more photoelectric cells 64, 64ᵃ which are sensitively responsive to light falling thereon, and which thereby change the characteristics of an electrical circuit (Fig. 7) which supplies current to the electric clutch 41 and to the electric brake 42. Since the design area D may not be of proper character to reflect light from the light source to the photoelectric cell, or may not be of a proper type or configuration so that it may be depended upon to reflect the light at the proper instant, each design area is provided with a registering line or point, here shown as a line Z (Fig. 8b) extending transversely of the band at the advancing edge of each design area.

However, a problem exists in that the photocell may be unable to distinguish between light reflected from the registration mark and that reflected from the printed characters in the design. Accordingly, if the photocell were in the control circuit continuously, it would probably be fired at some point before the registration mark were reached, resulting in cutting the banding material at the wrong place. To prevent this, the photocell is blanked-out for most of the length of the band, and is only connected into the circuit slightly before the light from source 62 encounters the registration mark. With this design, the photocell cannot react to printed characters yet assumes full control of the stopping of the feed rolls at the time the registration mark appears.

A four-pole manually actuable double-throw switch 74 (Figs. 7 and 21 to 24 inclusive) has four fixed contacts in an upper row and four fixed contacts in a lower row, this switch being so connected into the circuit that when closed in one direction or the other the machine is adjusted for severing bands from plain material or material having design areas, respectively.

In the "plain" position (Figs. 21 and 22), the switch 74 is set so that the lower row of fixed contacts is in use and the supply of current to the clutch and brake, respectively, is directly controlled by the cam-actuated switch $S^m$. When printed banding material is to be used, the switch 74 is manually set so that its upper row of fixed contacts is in use (Figs. 23 and 24), and although the switch $S^m$ is still actuated by cam 46 as before, the cutting off of the current to the clutch and its supply to the brake is now dependent upon the action of the photoelectric detector.

Tubes 68 and 68a in the wiring diagram (Fig. 7) are rectifiers supplying plate and grid voltages for the photocells 64 and 64a and other tubes of the circuit. Two photocells are preferably employed (with a single light source 62) for increased output. A thyratron 69, an amplifier 70 and a relay 71 are also included in the circuit. The relay 71 is equipped with single-pole, double-throw contacts (indicated at $S^2$, Figs. 23 and 24) which have the same relation to the clutch and brake as the corresponding contacts of switch $S^m$, and with contacts at $71^m$ (Fig. 7) for controlling the circuit of lamp 72. As indicated at 75, provision is made, by the use of a potentiometer or the like, for varying the intensity of the current supplied to the photocells 64 and 64a. A conveniently located push-button switch 77 (Figs. 1 and 7) is provided for stopping or starting the band-feeding means while the main drive motor is running, thereby to facilitate threading up the machine with a fresh supply of banding material. A socket 77a (Fig. 7a) receives a plug 77b (Fig. 7) at the end of a flexible cable 77c (Fig. 1) which supplies current to the photoelectric element. The circuit also comprises a switch 78 by means of which the apparatus may be adjusted so that the photoelectric cells will respond either to the approach or departure of a light-reflecting area. Two lamps 73 and 72, one red and the other amber, are preferably provided to indicate to the operator when the detector takes control and when the detector ceases to control, respectively.

Figures 8, 8A:
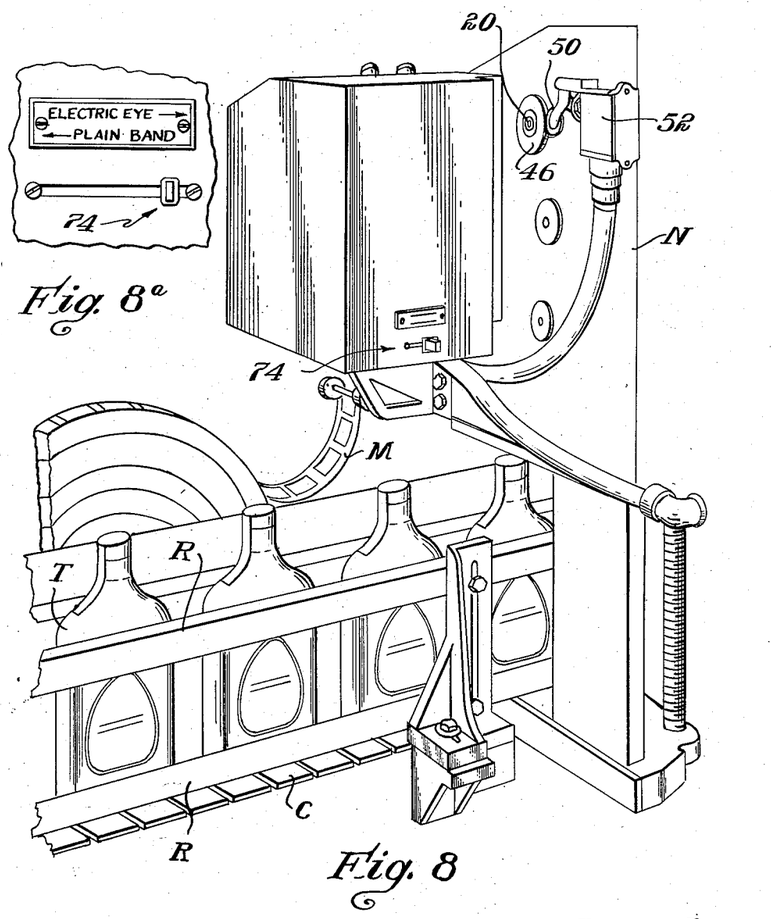
Fig. 8 is a fragmentary perspective view looking toward the left-hand side of the machine, from the rear, showing the switch for adjusting the feed mechanism to handle either plain banding material or banding material having spaced design areas thereon.
Fig. 8a is a fragmentary elevation, to larger scale than Fig. 8, showing details of the control switch.
Figures 8B, 9, 20:
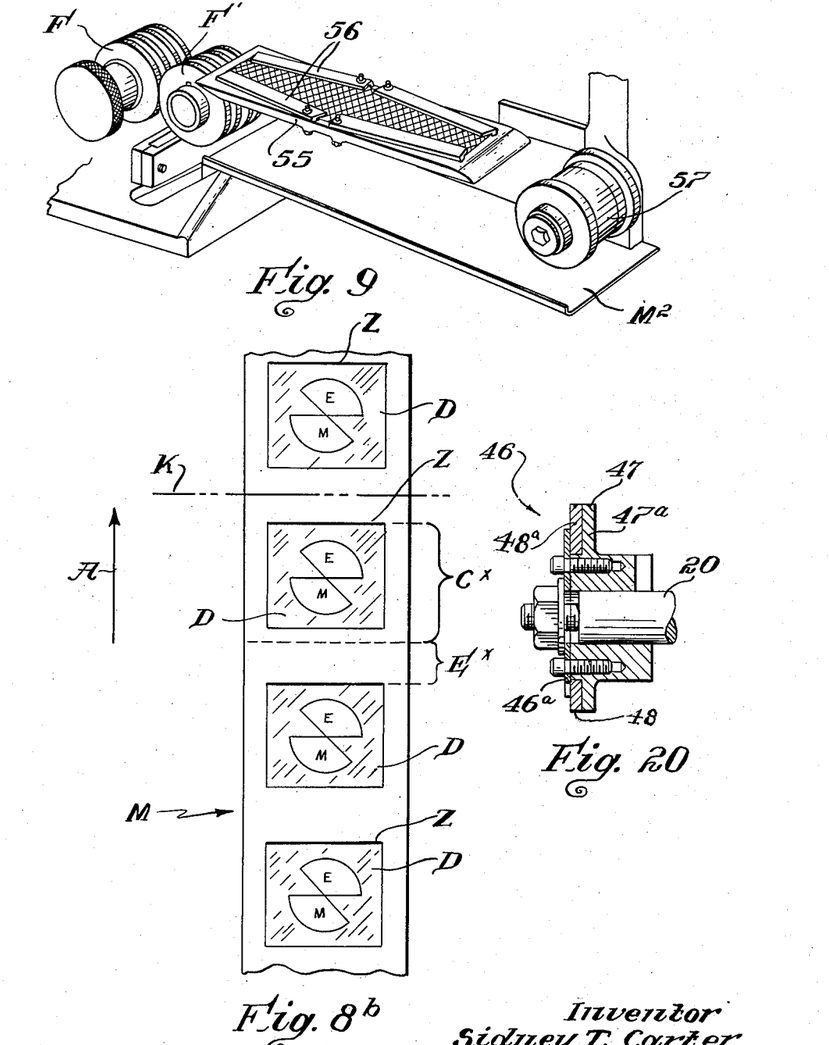
Fig. 8b is a diagrammatic plan view showing a length of banding material having spaced design areas thereon, and indicating the portions of the material at which the advance of the material is controlled by a cam, and by a photoelectric detector respectively.
Fig. 9 is a perspective view, to larger scale than Fig. 1, showing means for guiding the banding material toward the feed roll.
Fig. 20 is a diametrical section showing a control cam of adjustable type.
Figure 23:
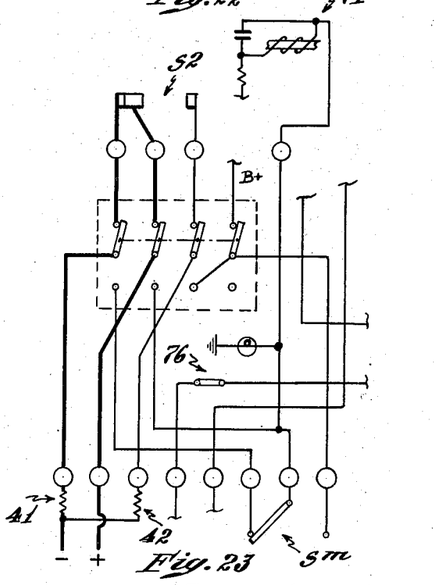
Fig. 23 is a diagram showing the clutch circuit when banding material provided with design areas is being used.
Figure 24:
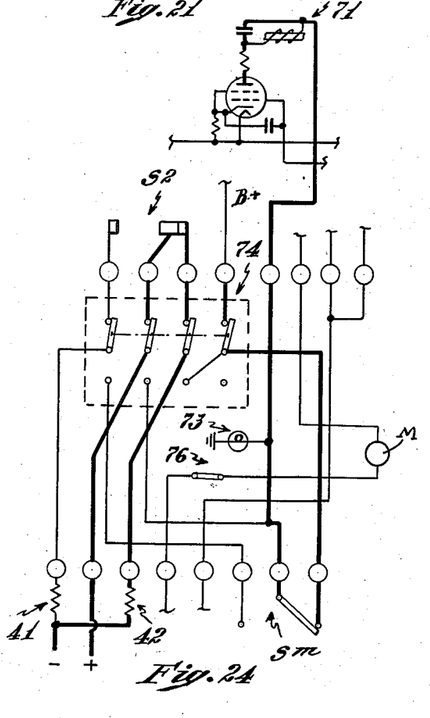
Fig. 24 is a diagram showing the brake circuit when banding material having design areas is being used.

At the start of a cycle of operations, assuming that the banding material is of the kind illustrated in Fig. 8a, having uniformly spaced design areas with a register mark associated with each design area, and that, in preparation for the use of this type of banding material, the switch 74 has been manually set, as illustrated in Figs. 23 and 24, the engagement of the low portion 48 of the constantly rotating cam 46 with the roll 49 sets the switch $S^m$ in the position illustrated in Fig. 23. With switches $S^m$ and 74 positioned as shown in Fig. 23, plate voltage is removed from the thyratron 69 (Fig. 7) thus deenergizing the relay 71 so that the relay switch $S^2$ snaps back to its normal position, thus closing the circuit through clutch 41 (Fig. 23). The feed rolls now advance the ribbon. Variations in the amount of light reflected from any portion of the ribbon, other than a register mark, onto the photocells now have no effect on the clutch circuit. However, when a register mark Z on the band passes the beam of light emitted by the lamp 62, the increased illumination falling on the photoelectric cells 64 and 64a causes the cells to carry more current. The resultant increased voltage drop across the resistor in the plate circuit of the photoelectric cell is amplified by the amplifier 70 and applied to the control grid of the thyratron 69. This triggers the thyratron to energize relay 71 thereby shifting the switch $S^2$ from normal position to the position of Fig. 24, thus cutting off current from the clutch and supplying current to the brake, and suddenly stopping the rotation of the feed rolls and the advance of the banding material. As the cam 46 continues to rotate its low portion again operates to set switch $S^m$ to the position of Fig. 23, cutting off plate voltage from the thyratron and permitting the relay switch to resume the normal position of Fig. 23 in which current is supplied to the clutch and the rolls start to turn.

More specifically, and referring to Fig. 8b, and assuming that the low portion of the cam 46, by contact with the roll 47 has started the feed roll, the material is advanced past the scanning beam by an amount represented by the bracket $C^x$, which includes the width of the design area plus a predetermined fractional part of the following clear space, but during this time, changes in current in the photoelectric detector have no effect on the clutch and brake circuits. When the high part of the cam 46 engages the roll 47, the switch $S^m$ is shifted to the position of Fig. 24. While the material M is moving through the distance represented by the bracket $E^x$, (Fig. 8a), where the banding material is clear or transparent, the light reflected from the material is insufficient to cause effective operation of the photoelectric detector although the thyratron is now connected into the control circuit. However, when the register line Z passes the slit in the casing 60, the light reflected by the line Z is sufficiently intense so to increase the current in the photoelectric cells that the thyratron is fired and relay switch $S^2$ is shifted to the position of Fig. 24 whereby the electric clutch is deenergized, the brake is instantly applied, and the red light 72 is lighted. The advance of the banding material at once ceases (although the machine as a whole continues to function)—the stopping taking place at such a point in the cycle that the line of action K of the movable cutter 59 is mid-way between adjacent design areas, so that the length of the banding material cut off at each actuation of the cutters is uniform and the design area on the part cut off is accurately positioned with respect to the opposite ends of the length which has been cut off.

Figures 12, 13:
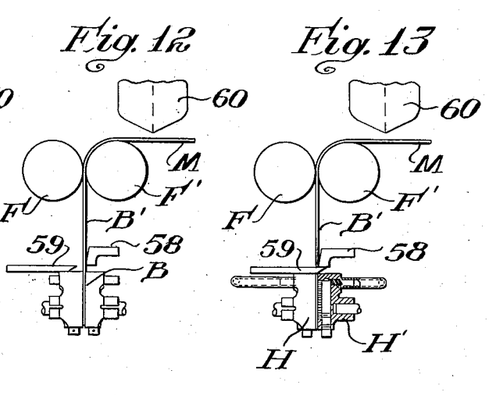

Referring to Figs. 10 to 17, the general sequence of operations which is followed in applying a band to a bottle neck is diagrammatically illustrated. Thus Fig. 10 shows the banding material M, the cutters 58 and 59, and the suction heads H and H' in the same positions as shown in Fig. 18, but in Figs. 10 to 13, the photoelectric detector 60 is understood to be the controlling element. In Fig. 10, the cutters have been separated, after having cut a preceding length of banding material; the suction heads H and H' (which carried said predetermined length rearwardly to the band applying position and then returned empty to the position shown in Fig. 10, during all of which time the feed rolls were standing idle) are separated and positioned in readiness to receive between them another length of banding material. In Fig. 11, the banding material is shown as being advanced downwardly by the feed rolls F and F', and in Fig. 12 the parts are shown at the instant at which the feed rolls stop turning in response to the operation of the photoelectric detector. Fig. 13 shows the cutter 59 as having advanced and as having severed the length of the banding material which is now held between the closely adjacent suction heads H and H'.

Figure 16:
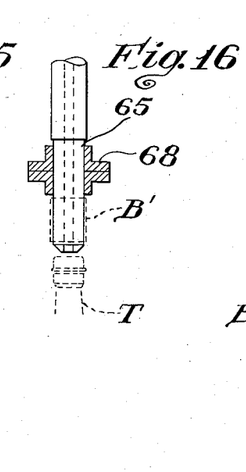
Figure 17:
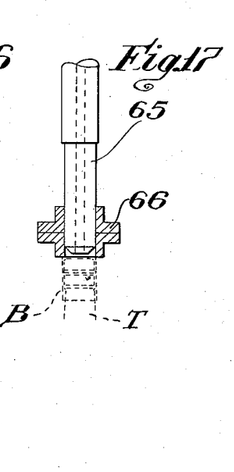
Figure 21:
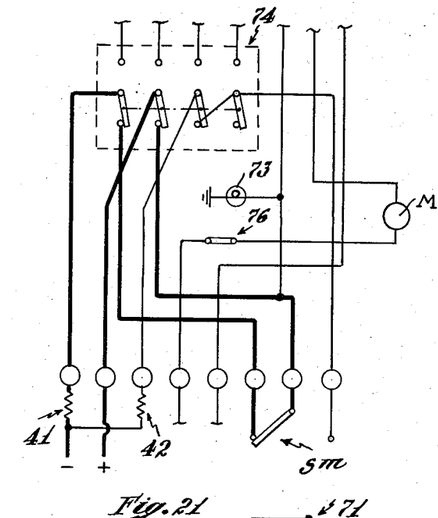
Fig. 21 is a diagram showing the clutch circuit when plain banding material is being used.
Figure 22:
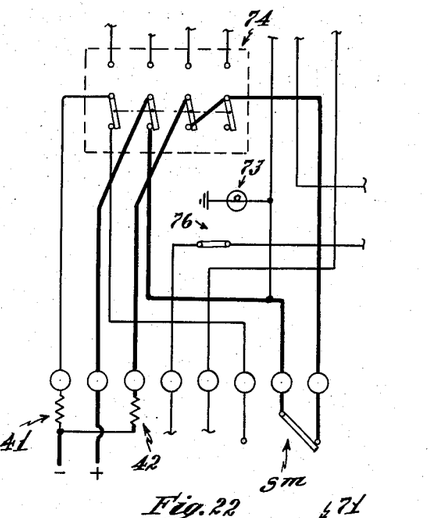
Fig. 22 is a diagram showing the brake circuit when plain banding material is being used.

The next step in the operation is for the suction heads to move rearwardly, suction having been created at the suction heads, and, as they move rearwardly, carrying the band between them, they separate so as partially to open the band (Fig. 14) just as the band reaches a position directly below the vertically movable expander sleeve 65. At this instant, a bottle T has come to rest in coaxial relation to the expander, and the expander now moves downwardly into the open band. Suction is broken at the suction heads and the latter further retreat and then move forwardly to the position shown in Fig. 15, while the stripper sleeve 65 moves down as shown in Fig. 16, carrying the band down toward the bottle neck. The expander now dwells while the stripper sleeve 65 slides downwardly along the expander, as shown in Fig. 17, thereby sliding the band from the expander down onto the bottle neck. The stripper and expander now rise and the bottle with the band thereon is advanced by the star wheel W and delivered onto the discharge conveyor.

The sensitivity control 75 is a potentiometer by means of which the output of amplifier 70 may be adjusted. This is necessary because the various colors used in banding materials and in printing inks cause more or less light to be reflected by the photocells. As the contrast in color used to fire the photocells is increased sensitivity may be decreased. The two pilot lights are used to enable the operator to determine if the control is functioning satisfactorily. The first light 73 (amber) is lighted when the photocell circuit assumes control. The second lamp 72 (red) is lighted when the photocell circuit stops the feed rolls. By observing the sequence of and the length of time between the lighting of these lamps the operator can detect improper adjustment of the limit switch cam.

While one desirable embodiment of the invention has herein been illustrated by way of example, it is to be understood that all equivalents and modifications which fall within the scope of the invention are contemplated.

I claim:

1. Apparatus for intermittently advancing banding material into the field of action of severing means, said apparatus comprising band-advancing means, a photoelectric detector comprising a photoelectric cell, means for directing a beam of light onto the banding material, and an electrical circuit in which the voltage varies in response to variations in the intensity of light reflected from the banding material, the banding material having thereon recurrent design areas separated by clear areas, each design area being of a character such as to reflect light of sufficient intensity to cause variations in voltage in the photoelectric detector circuit, a series of actuators spaced equally apart longitudinally of the banding material, and each associated with one respectively, of the design areas, each of the actuators being arranged at the leading edge of the corresponding design area and being of a character to reflect light with an intensity at least as great as that reflected by a design area, and control means capable, at times, of responding to variations in voltage in the detector circuit, said control means being so associated with the detector that when the latter responds to light reflected from a design area of the banding material, it would normally operate to stop the band-advancing means, and means operative to prevent the control means from so responding except when the photoelectric cell responds to light reflected from one of the actuators.

2. Apparatus for intermittently advancing banding material into the field of action of severing means, the means for advancing or stopping the banding material comprising a magnetic clutch and a magnetic brake, electrical control means connected with the circuits of the clutch and brake, said control means being operative, at times, to open the clutch circuit and close the brake circuit, a photoelectric detector comprising a photoelectric cell, means for directing a beam of light onto the banding material, and an electrical circuit in which voltage varies in response to variations in the intensity of light reflected from the banding material, the banding material itself being non-reflecting but having thereon recurrent design areas, each of a character to reflect light of an intensity sufficient to cause voltage variations in the detector circuit, a transversely extending registering line adjacent to the leading edge of each design area, said lines being equally spaced apart length wise of the banding material and each being of a character to reflect light of an intensity at least as great as that which is reflected by a design area, the circuit of the detector being so connected to that of the control means that when variaions in voltage in the detector circuit result from variations in the reflected light, the control means would normally act to open the clutch circuit and close the brake circuit, and means operative to prevent such action of the control means until a non-reflecting area of the banding material, just in advance of a registering line, is passing the detector.

3. Apparatus according to claim 2, wherein the means for preventing the control means from acting, until a non-reflecting area of the banding material is passing the detector, comprises a part which acts but once during each cycle of operation of the apparatus.

4. Apparatus according to claim 2, wherein the control means includes a thyratron, and means which operates to prevent the thyratron from acting until a non-reflecting area of the banding material is passing the detector, said last-named means comprises a switch in the circuit of the thyratron which is actuated once during each cycle of operation of the machine.

5. Apparatus according to claim 2, wherein the means for severing the banding material is so located, relatively to the photoelectric detector, that when the control means becomes capable of operating, during the movement of a non-reflecting area of the banding material past the photoelectric detector, the line of severance of the banding material will be substantially mid-way between the trailing edge of one design area and the advancing edge of the next design area.

6. A high speed band-applying machine of the kind wherein individual bands are automatically severed from a length of banding material which is received from a supply as a flattened tube or ribbon, the machine being operative to sever bands of predetermined lengths from banding material which has spaced design areas of a color or light-reflecting character different from the intervening clear portions of the banding material and having, at the advancing end of each design area, a registering element having definite light-reflecting characteristics, the machine comprising a pair of intermittently turning feed rolls between which the ribbon is always gripped and which, when turning, always turn at substantially the same angular velocity and so as to move the ribbon in the same direction and which are operative to advance the terminal portion of a ribbon of banding material into the field of action of severing means, and wherein the turning and stopping of said feed rolls is occasioned by an electric clutch and an electric brake respectively, characterized in that the supply of current to the clutch and brake is directly controlled by a relay switch which, in normal position, is set to supply current to the clutch, control means operative at times to cause the relay switch to shift from normal position to one in which it is set to supply current to the brake, a cam-actuated switch, and a constantly rotating cam for actuating said last-named switch, said cam making one complete revolution for each cycle of operation of the machine, a photoelectric detector including at least one photocell and means for directing a beam of light onto the moving banding material, the detector including an electrical circuit in which current varies in response to variations in the light reflecting from the surface of the banding material, said control means being capable, at times, of responding to variations in the current in the detector circuit, and thereby causing the relay switch to shift from clutch-energizing to brake-energizing position, the time period within which the control means is capable of so responding to variations in current in the detector circuit being determined by the setting of the cam-actuated switch, the cam which operates the cam-actuating switch being so contoured that during any given cycle of the machine, the control means first becomes capable of responding to current variations in the detector circuit after the trailing edge of a design area has passed the beam of light and while a clear area of the banding material is being scanned by the light beam.

7. A high speed band-applying machine according to claim 6 wherein the cam which operates the cam-actuated switch has low and high dwell portions and engages a cam follower to shift the cam-actuated switch, the passage of the cam follower from the high dwell portion to the low dwell portion of the cam being effective to close the clutch circuit and start the feed of the banding material, further characterized in that the control means comprises a thyratron having a plate and a grid, the grid being so connected to the detector circuit that variations in the detector current cause variations in the grid circuit of the thyratron, and the cam-actuated switch being so arranged that current is supplied to the plate circuit of the thyratron only when the cam follower is engaged by the high dwell position of the cam.

8. A high speed band-applying machine according to claim 6, and which is useful in severing bands of predetermined length from banding material which has spaced design areas of a color or light-reflecting character different from intervening clear portions of the banding material and also from banding material which is uniform as to color or light-reflecting properties, further characterized in having a manually actuable switch which in one position makes the relay switch effective to control the clutch and brake circuits and in another position prevents the relay switch from completing the clutch or brake circuits, said manually actuable switch, when in the latter position establishing a circuit whereby the cam-actuated switch becomes effective directly to control the supply of current both to the clutch and brake.

9. A high speed band-applying machine according to claim 6 wherein the switch-actuating cam comprises low and high dwell portions, and means for adjusting the relative effective lengths of said high and low dwell portions.

10. In apparatus for use in cutting uniform lengths from banding material which has clear areas alternating with contrasting design areas, each of said design areas having a light-reflecting registering element at its advancing edge, so that each length cut from the banding material extends from midway one clear area to midway the next clear area, said apparatus comprising a constantly turning shaft, a cam which turns in time with said shaft and makes one revolution for each cycle of operation, and a band cutter which is also actuated once during each cycle of operation in combination, photoelectric detector means comprising means for directing a beam of light against the banding material, a photoelectric cell arranged to receive light reflected from the banding material, and an electrical circuit in which voltage varies in response to variations in reflected light received by the photocell from the banding material, band-advancing means comprising at least one feed roll which always turns in the same direction, means for driving the feed roll comprising an electrical clutch, and means for stopping the feed roll comprising an electrical brake, a switch operative alternatively to close the clutch circuit or the brake circuit, respectively to start and thereby terminate advance of the banding material, and a switch-controlling element in said detector circuit capable of sensitively responding to voltage variations resulting from the reflection of light from the registering element and also to variations in voltage resultant from the reflection of light from a design area, means actuable by the cam to prevent variations in voltage in the photoelectric detector circuit from affecting said control element while a design area and a predetermined fraction of the following clear area are passing the beam of light, but which permits the control element to respond to voltage variations in the photoelectric detector circuit while the remainder of said clear area and the following registering element are passing the light beam, the parts being so constructed and arranged that when, in response to the passage of a registering element, the switch breaks the clutch circuit and closes the brake circuit, the banding material stops with the midpoint of a clear area in the path of the cutter just as the latter advances to sever the band.

11. Apparatus, according to claim 10, wherein said switch is a double-throw relay switch, and the control means includes a thyratron in the detector circuit operative, when it fires, to shift the switch from clutch-energizing to brake-energizing position, the thyratron being of a character such that it will not fire at any plate voltage less than that which results from the reception by the photocell of light of an intensity such as is reflected by a registering element.

References Cited in the file of this patent
UNITED STATES PATENTS

| | | |
|---|---|---|
| 1,988,486 | Ferenci | Jan. 22, 1935 |
| 2,140,834 | Gazette | Dec. 20, 1938 |
| 2,162,230 | Salfisberg | June 13, 1939 |
| 2,452,402 | Stringe | Oct. 26, 1948 |
| 2,636,732 | Howard | Apr. 28, 1953 |
| 2,648,183 | Dalton | Aug. 11, 1953 |
| 2,768,827 | Noble | Oct. 30, 1956 |